(12) United States Patent
Shinoki et al.

(10) Patent No.: US 10,883,647 B2
(45) Date of Patent: Jan. 5, 2021

(54) VACUUM HEAT INSULATOR AND METHOD OF MANUFACTURING THE SAME

(71) Applicant: Mitsubishi Electric Corporation, Chiyoda-ku (JP)

(72) Inventors: Toshio Shinoki, Chiyoda-ku (JP); Satoshi Nakatsu, Chiyoda-ku (JP); Hitoshi Maruyama, Chiyoda-ku (JP); Yoshikazu Yaji, Chiyoda-ku (JP); Shunkei Suzuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/092,398

(22) PCT Filed: May 12, 2016

(86) PCT No.: PCT/JP2016/064159
§ 371 (c)(1),
(2) Date: Oct. 9, 2018

(87) PCT Pub. No.: WO2017/195329
PCT Pub. Date: Nov. 16, 2017

(65) Prior Publication Data
US 2019/0170288 A1   Jun. 6, 2019

(51) Int. Cl.
*F16L 59/02* (2006.01)
*F16L 59/065* (2006.01)

(52) U.S. Cl.
CPC ........... *F16L 59/029* (2013.01); *F16L 59/065* (2013.01)

(58) Field of Classification Search
CPC ...... F16L 59/029; F16L 59/065; B32B 17/02; B32B 27/02; B32B 3/04; B32B 5/10; F22D 2201/14
See application file for complete search history.

(56) References Cited

U.S. PATENT DOCUMENTS

2007/0017625 A1*  1/2007  Otaki .................. B32B 5/02
                                                          156/148
2008/0280090 A1* 11/2008  Kim .................... B32B 3/04
                                                          428/69

(Continued)

FOREIGN PATENT DOCUMENTS

EP    1 669 485 A2    6/2006
EP    3 133 330 A1    2/2017

(Continued)

OTHER PUBLICATIONS

Espacenet Translation of WO2015/159646 (Year: 2019).*

(Continued)

*Primary Examiner* — Michael Zhang
(74) *Attorney, Agent, or Firm* — Xsensus LLP (57) ABSTRACT

A vacuum heat insulator which can prevent lowering of a heat insulation performance in its thickness direction, while ensuring a sufficient strength, is provided. The vacuum heat insulator reduces heat transfer in the thickness direction of a core from one surface side of the core to the other surface side thereof. The core includes a first fiber layer and a second fiber layer. The first fiber layer includes short fibers layered in the thickness direction. The second fiber layer includes long fibers layered in the thickness direction, and thickness fiber bundles which extend in the thickness direction, and which bind the long fibers. The long fibers are longer than the short fibers.

12 Claims, 5 Drawing Sheets

(56) References Cited

U.S. PATENT DOCUMENTS

| | | |
|---|---|---|
| 2009/0004450 A1 | 1/2009 | Otaki et al. |
| 2013/0142983 A1 | 6/2013 | Han et al. |
| 2015/0377407 A1 | 12/2015 | Shinoki et al. |

FOREIGN PATENT DOCUMENTS

| | | | | |
|---|---|---|---|---|
| JP | 62-130840 A | 6/1987 | | |
| JP | 2-169236 A | 6/1990 | | |
| JP | 2010-60048 A | 3/2010 | | |
| JP | 2010-242866 A | 10/2010 | | |
| JP | 2011-2033 A | 1/2011 | | |
| JP | 2011-58537 A | 3/2011 | | |
| JP | 2013-540607 A | 11/2013 | | |
| JP | 2015-48543 A | 3/2015 | | |
| JP | 205-137688 A | 7/2015 | | |
| WO | WO 2005/024107 A2 | 3/2005 | | |
| WO | WO 2015/159646 A1 | 10/2015 | | |
| WO | WO-2015159646 A1 * | 10/2015 | ............... | D04H 1/46 |
| WO | WO 2015/185643 A1 | 12/2015 | | |
| WO | WO-2015185643 A1 * | 12/2015 | ............ | F16L 59/029 |

OTHER PUBLICATIONS

Combined Chinese Office Action and Search Report dated Mar. 15, 2019 in Patent Application No. 201680085308.8 (with partial English translation and English translation of categories of cited documents), 18 pages.

International Search Report dated Aug. 9, 2016, in PCT/JP2016/064159 filed May 12, 2016.

* cited by examiner

VACUUM HEAT INSULATOR AND METHOD OF MANUFACTURING THE SAME

TECHNICAL FIELD

The present invention relates to a vacuum heat insulator and a method of manufacturing the same.

BACKGROUND ART

Vacuum heat insulators are known as heat insulators that reduce heat transfer. In general, vacuum heat insulators have a higher heat insulation performance than other heat insulators such as polystyrene foam. The vacuum heat insulators are therefore applied to various cooling apparatuses such as air-conditioning apparatuses and refrigerators.

In vacuum heat insulators, a layered body in which fiber materials are stacked in its thickness direction can be used as a core. For example, a known vacuum insulator includes a core which is formed by producing plural fiber sheets including stacked glass fiber webs bundled by needle punching, and stacking them together (patent literature 1). Furthermore, another known vacuum insulator includes a core into which a fibrous layered body including glass wool stacked and a surface material provided on a surface of the fibrous layered body are integrated by needle punching (patent literature 2).

CITATION LIST

Patent Literature

Patent Literature 1: Japanese Unexamined Patent Application Publication No. 2015-137688
Patent Literature 2: Japanese Unexamined Patent Application Publication No. 2010-60048

SUMMARY OF INVENTION

Technical Problem

In such vacuum heat insulators including cores obtained by needle punching as described above, thickness fibers can be formed in the thickness direction of the core. In the case where the formed thickness fibers are used as a heat medium, the heat insulation performance of the vacuum heat insulator may be lowered by heat transfer in the thickness direction. In contrast, in the case of providing no thickness fibers, it may be hard to form a core, since fibers are not bundled with a sufficient force.

The present invention has been made in consideration of the above circumstances, and an object of the invention is to provide a vacuum heat insulator which can prevent lowering of a heat insulation performance in the thickness direction of the vacuum heat insulator, while ensuring a sufficient strength and reliability, and also to provide a method of manufacturing the vacuum heat insulator.

Solution to Problem

A vacuum heat insulator according to an embodiment of the invention reduces heat transfer in a thickness direction of a core from one surface side of the core to the other surface side thereof. The core includes a first fiber layer and a second fiber layer. The first fiber layer includes short fibers layered in the thickness direction. The second fiber layer includes long fibers layered in the thickness direction and thickness fiber bundles which extend in the thickness direction and bind the long fibers. The long fibers are longer than the short fibers.

A manufacturing method according to the embodiment of the invention is a method of manufacturing a vacuum heat insulator which reduces heat transfer in a thickness direction of a core from one surface side of the core to the other surface side thereof. The method includes a first preparation step, a second preparation step and an integration step. In the first preparation step, a first fiber layer including short fibers layered in the thickness direction is prepared. In the second preparation step, a second fiber layer including long fibers which are layered in the thickness direction and longer than the short fibers is prepared. In the integration step, thickness fiber bundles extending in the thickness direction are formed in the second fiber layer to bind the long fibers.

Advantageous Effects of Invention

In a vacuum heat insulator according to an embodiment of the present invention, a core is formed to include a first fiber layer and a second fiber layer, the first fiber layer including short fibers layered in a thickness direction, the second fiber layer including long fibers layered in the thickness direction and a thickness fiber bundles extending in the thickness direction. According to a manufacturing method according to the embodiment of the invention, a vacuum heat insulator including a core formed in the following manner is manufactured. The core is formed to include a first fiber layer and a second fiber layer, the first fiber layer including short fibers layered in the thickness direction, the second fiber layer including long fibers layered in the thickness direction and thickness fiber bundles extending in the thickness direction. The short fibers and long fibers layered in the thickness direction can reduce heat transfer in the thickness direction. In addition, the thickness fiber bundles extending in the thickness direction can bind the short fibers and long fibers, and thus maintain strength. It is therefore possible to provide a vacuum heat insulator which can prevent lowering of a heat insulation performance in the thickness direction of the vacuum heat insulator, while ensuring a sufficient strength and reliability, and also to provide a method of manufacturing the vacuum heat insulator.

DESCRIPTION OF EMBODIMENTS

Vacuum heat insulators according to embodiments disclosed in the present application will be described in detail with reference to the accompanying drawings. It should be noted that the embodiments are examples, and the present invention is not limited to the embodiments.

Embodiment 1

Figure 1:
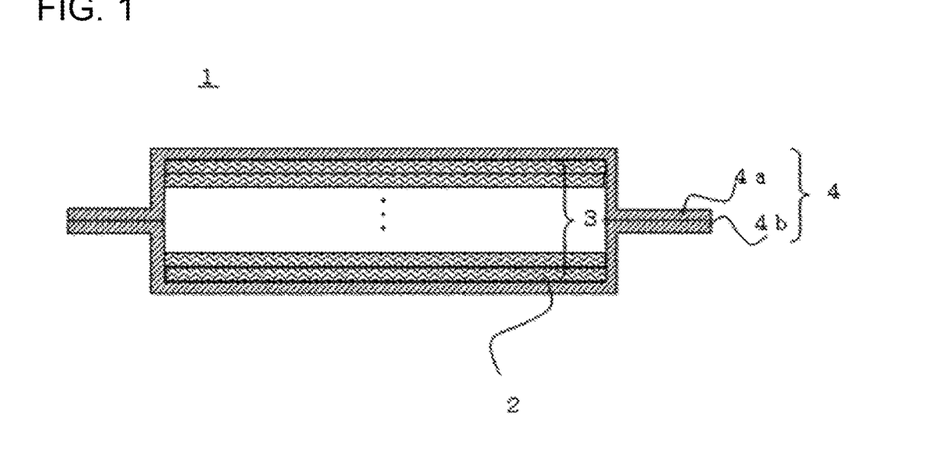
FIG. 1 is a schematic sectional view illustrating a vacuum heat insulator according to embodiment 1 of the present invention.

FIG. 1 is a schematic sectional view illustrating a vacuum heat insulator 1 according to embodiment 1 of the present invention. As illustrated in FIG. 1, the vacuum heat insulator 1 includes a core 3 which greatly contributes to a thermal insulation performance and a cover 4 which covers the core 3. The core 3 includes fiber layers 2 stacked together. Each of the fiber layers 2 includes a first fiber layer 5 and a second fiber layer 7 which will be described later. The cover 4 includes two cover sheets 4a and 4b which are bonded to each other on their four sides to enclose the core 3. That is, in the vacuum heat insulator 1, the core 3 includes the fiber layers 2 stacked together and each including the first fiber layer 5 and the second fiber layer 7, and is accommodated in the cover 4 including the two cover sheets 4a and 4b bonded to each other on their four sides.

Figure 2:
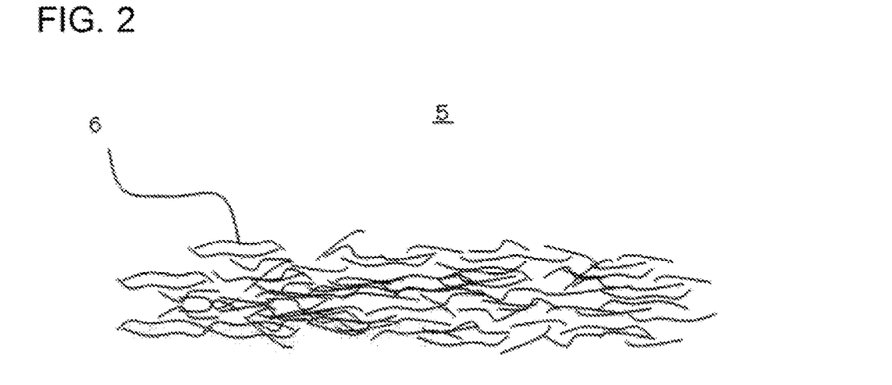
FIG. 2 is an enlarged schematic sectional view of a first fiber layer of the vacuum heat insulator according to embodiment 1 of the present invention.

FIG. 2 is an enlarged schematic sectional view of each of the first fiber layers 5 in the vacuum heat insulator 1 according to embodiment 1 of the present invention. The first fiber layer 5 included in each of the fiber layers 2 contains a plurality of short fibers 6 stacked together. The short fibers 6 have crimp properties. The first fiber layer 5 thus has a web structure in which the short fibers 6 are reasonably intertwined with each other. The web structure is obtained because of the crimp properties, and can contribute to maintenance of the strength of the first fiber layer 5. It should be noted that layering of the short fibers 6 means a state in which short fibers 6 spread over planes are stacked in such a way as to be layered.

The first fiber layer 5 is a layered body of short glass fibers (glass wool) having diameters of $\varphi$ 3 to 6 μm, which are obtained by fiberizing, for example, a melted glass material with a centrifugation method using a spinner. Generally, glass wool has lengths of approximately several millimeters to a dozen or so millimeters, specifically, lengths smaller than or equal to approximately 20 mm. Glass fibers of the glass wool themselves have crimp properties. The first fiber layer 5 is formed by collecting glass wool discharged from the spinner with, for example, a conveyor, compressing the glass wool with, for example, a roller, and shaping the glass wool into a sheet such that it basically maintains a web state.

In the above example of the first fiber layer 5, short fibers 6 of glass wool formed by the centrifugation method are used. However, the short fibers 6 may be formed by a flame method in which a melted glass material is blown while being stretched with a gas burner, to thereby form fibers. In the case of applying the flame method, short fibers 6 can be formed to not only have crimp properties as well as the short fibers 6 formed by the centrifugation method, but have very small diameters, for example, an average diameter smaller than or equal to approximately $\varphi$ 1.0 μm.

Figure 3:
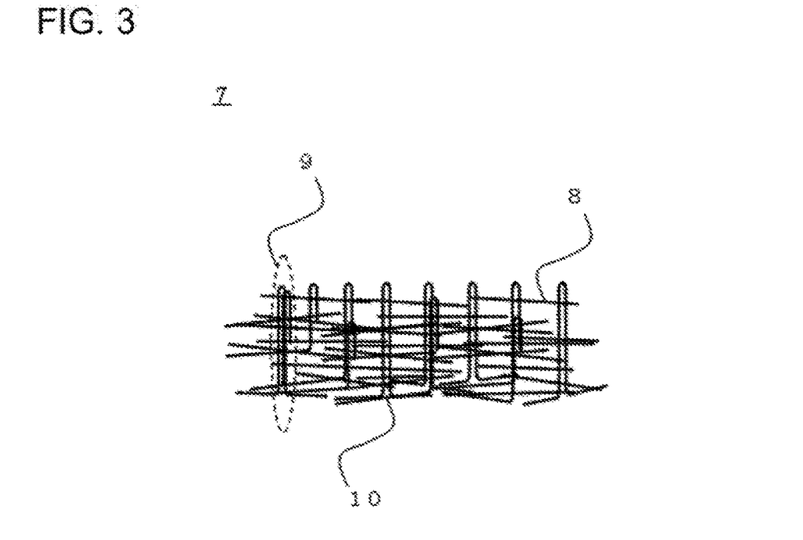
FIG. 3 is an enlarged schematic sectional view of a second fiber layer of the vacuum heat insulator according to embodiment 1 of the present invention.

FIG. 3 is an enlarged schematic sectional view of the second fiber layer 7 in the vacuum heat insulator 1 according to embodiment 1 of the present invention. The second fiber layer 7 included in each of the fiber layers 2 has a stacked structure that long fibers 8 extending in the longitudinal direction of the second fiber layer 7 (the right/left direction in FIG. 3) are layered in the thickness direction of the second fiber layer 7 (the up/down direction in FIG. 3). The long fibers 8 have a high level of straightness, and are not intertwined with each other. Therefore, the second fiber layer 7 has a layered structure which is widely distributed over the entire planes including the stacked long fibers 8. It should be noted that layering of the long fibers 8 means a state in which long fibers 8 provided over planes are stacked to be layered.

The second fiber layer 7 further includes a plurality of thickness fiber bundles 9 extending in a direction (the above thickness direction, that is, the up/down direction in FIG. 3) substantially orthogonal to a direction in which the long fibers 8 extend (which corresponds to the above longitudinal direction, that is, the right/left direction in FIG. 3). The thickness fiber bundles 9 extend in the direction substantially orthogonal to the long fibers 8, and have a function of binding the long fibers 8. Each of the thickness fiber bundles 9 has a fiber opening 10 which is open on one of surface sides of the second fiber layer 7 which are located on both sides in the thickness direction (the up/down direction in FIG. 3). It should be noted that extending of the thickness fiber bundles 9 means that the thickness fiber bundles 9 are located such that the axial direction thereof is coincident with the thickness direction of the second fiber layer 7.

The fiber opening 10 is formed by, for example, driving a needle into the second fiber layer 7. To be more specific, needles are driven into the second fiber layer 7 from one surface side of the second fiber layer 7 to the other surface side thereof, thereby forming fiber openings 10. When the needles are driven from the one surface side of the second fiber layer 7 to the other surface side thereof, thickness fiber bundles 9 are each formed to have a protrusion which protrudes from the other surface side. That is, by driving the needles, each of the thickness fiber bundles 9 is formed to have a protrusion at one end and a fiber opening 10 at the other end. The sizes of the fiber openings 10 depend on those of the driven needles.

The first fiber layer 5 is stacked on one surface side of the second fiber layer 7, which contains the thickness fiber bundles 9 including the fiber openings 10 and the protrusions, thereby forming each fiber layer 2.

Figure 4:
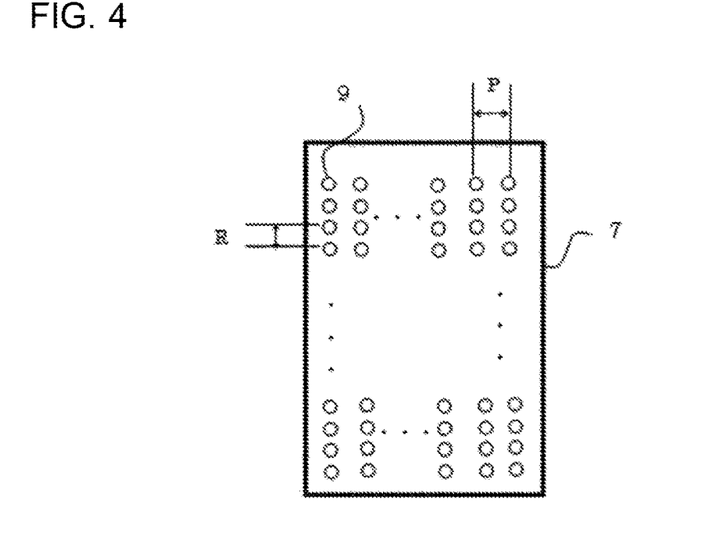
FIG. 4 is a schematic view illustrating arrangement of thickness fiber bundles in embodiment 1 of the present invention.

FIG. 4 is a schematic view illustrating arrangement of the thickness fiber bundles 9 in embodiment 1 of the present invention. To be more specific, this view is a schematic plan view illustrating an example of the arrangement of the thickness fiber bundles 9 at a surface of the second fiber layer 7. In the example, as illustrated in FIG. 4, the thickness fiber bundles 9 are arranged at intervals of distance R (which is a distance in a direction along the long side of the second fiber layer 7, that is, in the vertical direction of FIG. 4), and also arranged at intervals of distance P (which is a distance in a direction along the short-side of the second fiber layer 7, that is, in the horizontal direction of FIG. 4).

The long fibers 8 of the second fiber layer 7 are glass fibers which are obtained by cutting a continuous fiber formed of a melted glass material by a drawing method into pieces having lengths greater than approximately 20 mm (for example, approximately 50 mm). The long fibers 8 are longer than the short fibers 6. The fiber diameter of each of the long fibers 8 can be relatively arbitrarily determined to fall within the range of approximately $\varphi$ 6 µm to $\varphi$ 24 µm. The second fiber layer 7 thus has a layered structure of the long fibers 8 having a uniform fiber diameter. In the second fiber layer 7, the thickness fiber bundles 9 are applied to a layered structure of the long fibers 8 which are layered while being separated and spread over planes, the thickness fiber bundles 9 being arranged at intervals in a direction along vertically opposite sides of the surface of the second fiber layer 7 (a direction in which adjacent thickness fiber bundles 9 are separated by the distance P and the direction along the short side of the second fiber layer 7, that is, the horizontal direction of FIG. 4), and also arranged at intervals in a direction along horizontally opposite sides of the surface of the second fiber layer 7 (a direction in which adjacent thickness fiber bundles 9 are separated by the distance R and the direction along the long side of the second fiber layer 7, that is, the vertical direction of FIG. 4).

The core 3 has a layered structure that the fiber layers 2 including the above first fiber layer 5 and second fiber layer 7 stacked together are stacked. When the core 3 is accommodated in the vacuum heat insulator 1 by vacuum sealing, the first fiber layer 5 is compressed such that its thickness is reduced to about 1/10 of the thickness of the fiber layer 5 not yet subjected to the vacuum sealing. Also, when the core 3 is accommodated in the vacuum heat insulator 1 by the vacuum sealing, the second fiber layer 7 is compressed such that its thickness is reduced to about 1/2.6 of the thickness of the second fiber layer not yet subjected to the vacuum sealing.

The cover 4 includes the two cover sheets 4a and 4b, which are provided to hold the core 3 from both opposite sides in a layering direction in which the layers are stacked. The two cover sheets 4a and 4b are each formed of a laminate film having a multi-layer structure. As the laminate film, an aluminum laminate sheet that for example, drawn nylon (ONy), aluminum-deposited polyethylene terephthalate (Al-deposited PET), aluminium foil (Al foil) and non-drawn polypropylene (CPP) are layered may be used. For example, the laminate film is formed to have an ONy layer having a film thickness of 25 µm, an Al-deposited PET layer having a film thickness of 12 µm, an Al foil layer having a film thickness of 7 µm and a CPP layer having a film thickness of 30 µm.

Figure 5:
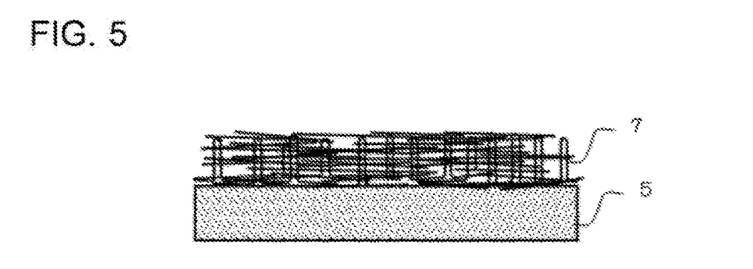
FIG. 5 is a schematic sectional view of a stacked structure of the first fiber layer and the second fiber layer in embodiment 1 of the present invention.
Figure 6:
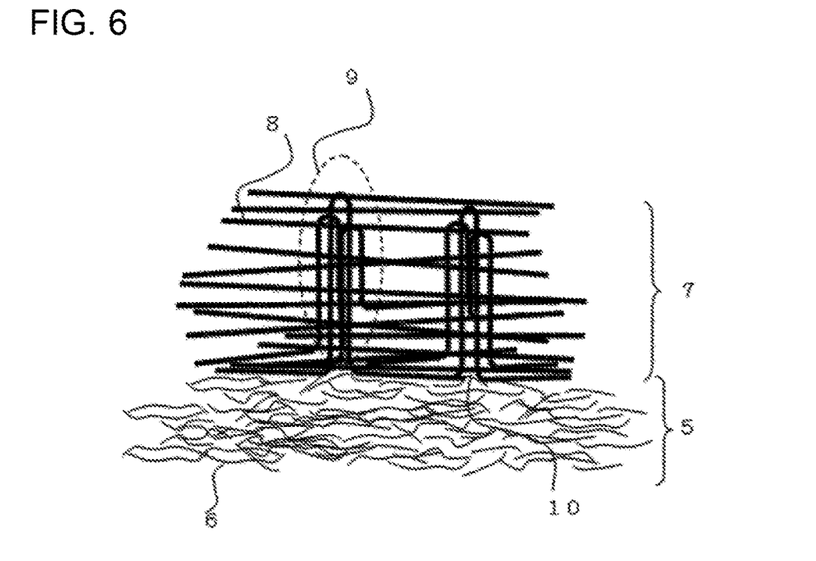
FIG. 6 is an enlarged schematic view illustrating a contact surface between the first fiber layer and the second fiber layer in the stacked structure thereof in embodiment 1 of the present invention.

The configuration of the core 3 will be described in more detail. FIG. 5 is a schematic sectional view of a stacked structure of the first fiber layer 5 and the second fiber layer 7 in embodiment 1 of the present invention. FIG. 6 is an enlarged schematic view illustrating a contact surface between the first fiber layer 5 and the second fiber layer 7 in the stacked structure in embodiment 1 of the present invention. In each of the fiber layers 2 included in the core 3, the first fiber layer 5 and the second fiber layer 7 are in contact with each other at the contact surface of the stacked structure. The thickness fiber bundles 9 provided in the second fiber layer 7 extend in a direction substantially orthogonal to the long fibers 8 (which corresponds to the layering direction, that is, a direction orthogonal to a surface of the fiber layer). That is, the thickness fiber bundles 9 are substantially parallel to the thickness direction of the second fiber layer 7 (which is the vertical direction of FIGS. 5 and 6). The thickness fiber bundles 9 can thus bind the long fibers 8 which have a high level of straightness, and are provided as main structural elements of the second fiber layer 7.

The thickness fiber bundles 9 are formed by, for example, needle punching that needles are driven into the second fiber layer 7 in the direction orthogonal to the surface of the fiber layer (which is the thickness direction of the second fiber layer 7, that is, the vertical direction of FIGS. 5 and 6).

The core 3 includes at least one fiber layer 2 including the first fiber layer 5 containing no thickness fiber bundle 9 formed therein and the second fiber layer 7 containing the thickness fiber bundles 9 formed therein. Therefore, in the thickness direction of the core 3, the lengths of the thickness fiber bundles 9 formed in the second fiber layer 7 are smaller the thickness of the core 3. Thus, the thickness fiber bundles 9 does not extend from one surface side of the core 3 to the other surface side thereof. It is therefore possible to restrict heat transfer from the one surface side of the core 3 toward the other surface side thereof.

In an example of the vacuum heat insulator 1 as illustrated in FIGS. 5 and 6, the thickness fiber bundles 9 include the fiber openings 10 on one surface side of the second fiber layer 7. To be more specific, the thickness fiber bundles 9 include the fiber openings 10 on a surface side of the second fiber layer 7 which is stacked on the first fiber layer 5 in the fiber layer 2.

In the vacuum heat insulator 1 according to embodiment 1, as illustrated in FIG. 6, some of the short fibers 6 contained in the first fiber layer 5 are located to protrude and to be inserted into the fiber openings 10 of the second fiber layer 7. Because of the short fibers 6 protruding into the fiber openings 10, a relative displacement between the first fiber layer 5 and the second fiber layer 7 in the fiber layer 2 is reduced, since the short fibers 6 have crimp properties. It is therefore possible to enhance a tensile strength of the fiber layer 2 in an extending direction of the long fibers 8 (the longitudinal direction of the layer, the horizontal direction of FIGS. 5 and 6, the direction in which adjacent thickness fiber bundles 9 are separated by the distance R and the direction along the long side of the second fiber layer 7, that is, the vertical direction of FIG. 4)

In formation of the fiber layers 2, in the case where stacking of the first fiber layer 5 and the second fiber layer 7 is followed by a process for drawing in the direction along the horizontally opposite sides, which corresponds to the direction along the long side, a tensile stress which can act on the second fiber layer 7 in the direction along the horizontally opposite sides, which corresponds to the direction along the long side, is great, but a tensile stress which can act on the second fiber layer 7 in the direction along the vertically opposite sides, which corresponds to the direction along the short side, is relatively small. Therefore, with respect to the thickness fiber bundles 9, the distance P can be set greater than the distance R. That is, in the vacuum heat insulator 1 according to embodiment 1, it is possible to reduce the number of thickness fiber bundles 9 per unit area, which are arranged in the direction along the vertically opposite sides, which corresponds to the direction along the short side.

If the number of thickness fiber bundles 9 in each of the fiber layers 2 is increased, the force of binding the long fibers 8 is enhanced, and the strength of each fiber layer 2 is also enhanced. However, the thickness fiber bundles 9, which are substantially perpendicular to the extending direction of the long fibers 8, can promote heat transfer between one surface side of each fiber layer 2 and the other surface side thereof (heat transfer in the thickness direction of each fiber layer 2). Therefore, if the number of thickness fiber bundles 9 in each fiber layer 2 is increased, there is a possibility that the heat insulation performance of the vacuum heat insulator 1 will be lowered. In contrast, the force of binding the long fibers 8 is weakened simply if the number of thickness fiber bundles is decreased. Consequently, the strength of each fiber layer 2 cannot be maintained, as a result of which there is a possibility that the vacuum heat insulator 1 could not be manufactured.

In the above vacuum heat insulator 1 according to embodiment 1, the number of thickness fiber bundles 9 per unit area in the direction in which adjacent thickness fiber bundles 9 are separated by the distance P can be reduced. Therefore, in embodiment 1, it is possible to prevent heat transfer between one surface side of the fiber layer 2 and the other surface side thereof (heat transfer in the thickness direction of the fiber layer 2) as much as possible, while maintaining the force of binding the multiple long fibers 8 and thereby maintaining the strength, and ensuring reliability. It is also possible to prevent lowering of the heat insulation performance of the vacuum heat insulator 1.

In the vacuum heat insulator 1 according to embodiment 1, as illustrated in FIG. 2, the first fiber layer 5 includes the short fibers 6. In the first fiber layer 5 including the plural short fibers 6, heat needs to pass between a larger number of fibers to transfer by a given distance than in the second fiber layer 7 containing the plural long fibers 8. Therefore, the first fiber layer 5 including the short fibers 6 is considered to more effectively reduce heat transfer than the second fiber layer 7 including the long fibers 8. However, in the first fiber layer 5 including the short fibers 6, there is a possibility that some of the short fibers 6 will be provided in the fiber layer to extend in the thickness direction. If the number of short fibers 6 extending in the fiber layer in the thickness direction is increased, it may promote heat transfer between one surface side of the fiber layer 2 and the other surface side thereof (heat transfer in the thickness direction of the fiber layer 2) as well as the thickness fiber bundles 9 as described above, thereby lowering the heat insulation performance of the vacuum heat insulator 1.

In the above vacuum heat insulator 1 according to embodiment 1, the first fiber layer 5 having a web structure in which the short fibers 6 are reasonably intertwined with each other is pressed by the fiber layer 2 including the long fibers 8 which straightly extend in the longitudinal direction of the layer (the horizontal direction of FIGS. 5 and 6, the direction in which adjacent thickness fiber bundles 9 are separated by the distance R and the direction along the long side of the second fiber layer 7, that is, the vertical direction of FIG. 4). Thus, the short fibers 6 included in the first fiber layer 5 are provided to extend in the longitudinal direction of the layer (the horizontal direction of FIGS. 5 and 6, the direction in which adjacent thickness fiber bundles 9 are separated by the distance R and the direction along the long side of the second fiber layer 7, that is, the vertical direction of FIG. 4) as much as possible. Therefore, it is possible to more effectively reduce heat transfer in the first fiber layer in the thickness direction, thereby further improving the heat insulation performance of the vacuum heat insulator 1.

With respect to the vacuum heat insulator 1 according to embodiment 1, the above explanation is given by referring to by way of example, formation of the thickness fiber bundles 9, which is achieved by driving the needles into the long fibers 8 in the second fiber layer 7. However, the present invention is not limited to such an example. For example, the thickness fiber bundles 9 may be sewed using fibers different from the long fibers 8 like a product sewed with a sewing machine. In such a case also, the fiber openings 10 can be formed at portions of the thickness fiber bundles 9, where the needless are driven.

<Method of Manufacturing Vacuum Heat Insulator 1>

Figure 7:
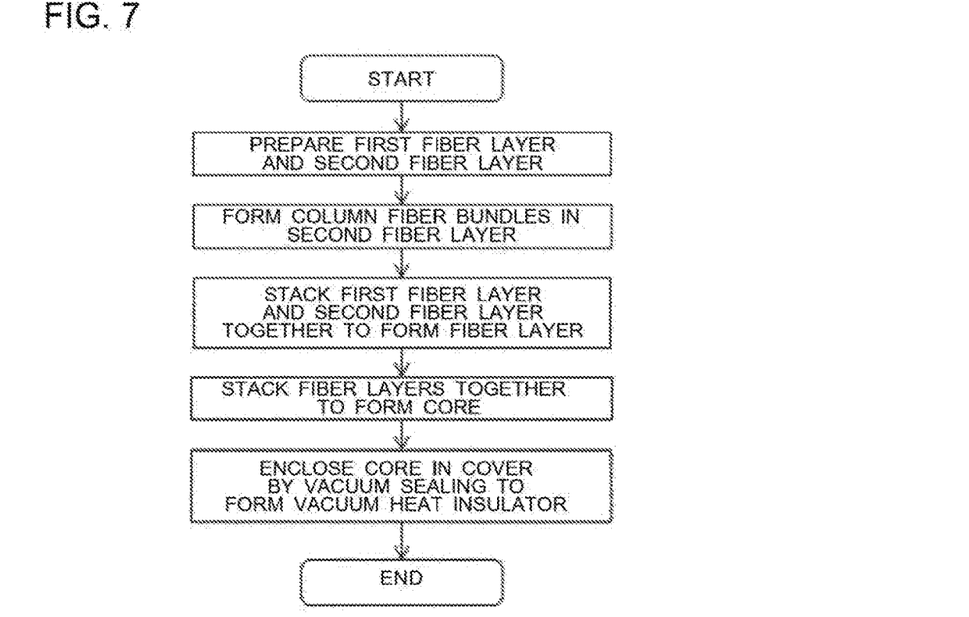
FIG. 7 is a flowchart illustrating a method of manufacturing the vacuum heat insulator according to embodiment 1 of the present invention.

A method of manufacturing the vacuum heat insulator 1 according to embodiment 1 will be explained. FIG. 7 is a flowchart illustrating the method of manufacturing the vacuum heat insulator according to embodiment 1.

The first fiber layer 5 having a web structure including the short fibers 6 and the second fiber layer 7 including the layered long fibers 8 are prepared (step S1). To be more specific, the method of manufacturing the vacuum heat insulator 1 according to embodiment 1 includes a first preparation step of preparing the first fiber layer 5 including the short fibers 6 layered in the thickness direction of the core 3 and a second preparation step of preparing the second fiber layer 7 including the long fibers 8 layered in the thickness direction of the core 3.

While the prepared second fiber layer 7 is being moved in the direction along the horizontally opposite sides (in the direction in which adjacent thickness fiber bundles 9 are separated by the distance R), needle punching in which needles are driven from one surface side of the second fiber layer 7 toward the other surface side thereof is performed to form the thickness fiber bundles 9 such that in the second fiber layer 7, the distance P is greater than the distance R (step S2). To be more specific, through the above steps, a sheet that second fiber layers 7 containing the thickness fiber bundles 9 formed therein are continuously formed is prepared, and the prepared sheet is cut into pieces having a desired width, whereby plural second fiber layers 7 containing the thickness fiber bundles 9 formed therein are formed.

The formed thickness fiber bundles 9 have the fiber openings 10 on one surface side of the second fiber layer 7 and the protrusions on the other surface side of the second fiber layer 7. These thickness fiber bundles 9 can bind the long fibers 8 included in the second fiber layer 7. That is, the method of manufacturing the vacuum heat insulator 1 according to embodiment 1 further includes an integration step of forming the thickness fiber bundles 9 in the second fiber layer 7 to bind the long fibers 8, the thickness fiber bundles 9 extending in the thickness direction of the core 3.

In the above manufacturing method, when the second fiber layer 7 is moved, a greater tensile stress can act in the direction along the vertically opposite sides of the second fiber layer 7 than in the direction along the horizontally opposite sides thereof (the direction in which adjacent thickness fiber bundles 9 are separated by the distance P). However, in the vacuum heat insulator 1 according to embodiment 1, the thickness fiber bundles 9 are arranged such that the distance R is smaller than the distance P. Therefore, the total number of thickness fiber bundles 9 can be reduced at the same time as they can be made to also have an appropriate strength even against the greater tensile stress acting in the direction along the vertically opposite sides than that in the direction along the horizontally opposite sides.

At the time of forming the thickness fiber bundles 9, some thickness fiber bundles 9 are formed to be arranged at longitudinal-direction arrangement intervals in a longitudinal direction of the core 3, and some thickness fiber bundles 9 are formed to be arranged at transverse-direction arrangement intervals in a transverse direction of the core 3. The longitudinal-direction arrangement intervals are smaller than the transverse-direction arrangement intervals. That is, the method of manufacturing the vacuum heat insulator 1 according to embodiment 1 includes a longitudinal-direction arrangement step of forming some of the thickness fiber bundles 9 such that they are arranged at the longitudinal-direction arrangement intervals in the longitudinal direction of the core 3, and a transverse-direction arrangement step of forming some of the thickness fiber bundles such that they are arranged at the transverse-direction arrangement intervals, which are greater than the longitudinal-direction arrangement intervals, in the transverse direction of the core 3, the longitudinal direction and the transverse direction of the core 3 being different from the thickness direction. By such a manufacturing method, it is possible to provide a vacuum heat insulator 1 which can prevent lowering of the heat insulation performance in the thickness direction, while ensuring a sufficient strength and reliability of the core 3.

In order to insert some of the plural short fibers 6 into the fiber openings 10, the second fiber layer 7 containing the thickness fiber bundles 9 and the prepared first fiber layer 7 are layered such that one surface side of the second fiber layer 7 and the prepared first fiber layer 7 contact each other, thereby forming the fiber layer 2 (step S3). Plural fiber layers 2 each including first and second fiber layers 5 and 7 layered are formed, and the formed fiber layers 2 are stacked together, thereby forming the core 3 (step S4). The formed core 3 is held between the cover 4, which is prepared in another process, and is then subjected to vacuum sealing in the cover 4, thereby forming the vacuum heat insulator 1 (step S5).

In the above method of manufacturing the vacuum heat insulator 1, the vacuum heat insulator 1 are formed to be made up of the core 3 and the cover 4. The core 3 is formed by stacking the fiber layers 2 prepared as described above to make them have a desired thickness, and cutting the stacked fiber layers 2 into pieces. In the case of forming the core 3, it is preferable that the fiber layers 2 be cut such that the resultant core 3 has a desired size, in consideration of distortion caused by the difference in pressure between the atmosphere and vacuum depending on the vacuum sealing. This is because distortion occurs after the vacuum sealing, and as a result there is a possibility that the vacuum heat insulator 1 could not obtain a desired heat insulation performance.

With respect to the above method of manufacturing the vacuum heat insulator 1, the above explanation is given by referring to by way of example the case where the thickness fiber bundles 9 are formed while moving the prepared second fiber layer 7 in the direction along the horizontally opposite sides, and the second fiber layer 7 and the first fiber layer 5 are then stacked. However, a layered product may be made by stacking the second fiber layer 7 and the first fiber layer 5 immediately after forming the thickness fiber bundles 9 in the second fiber layer 7. The layered product is continuously made while performing the needle punching of driving needles from one surface side of the second fiber layer 7 toward the other surface side thereof, and the layered produce is moved in the direction along the horizontally opposite sides. At this time, the thickness fiber bundles 9 may be formed such that in the second fiber layer 7, the distance P is greater than the distance R. In this manufacturing method, the layered first fiber layer 5 can function as a support for the second fiber layer 7 against the tensile stress in the direction along the vertically opposite sides. Thus, a further sufficient strength and reliability of the core 3 can be easily ensured.

In the case of performing vacuum sealing on the core 3, it is preferable that the core 3 be dried until immediately before the vacuum sealing, in order to reduce lowering of the degree of vacuum which is caused by internal gas after the vacuum sealing.

The cover 4 is prepared by cutting a cover sheet shaped in a roll into two cover sheets 4a and 4b having a desired width, and then stacking the two cover sheets 4a and 4b on each other. The stacked cover sheets 4a and 4b are bonded to each other by heat sealing at their two sides which extend in the direction along the horizontally opposite sides, i.e. the direction in which adjacent thickness fiber bundles 9 are separated by the distance R, and are also bonded by heat sealing at their one side which extends in the direction along the vertically opposite sides, i.e., the direction in which adjacent thickness fiber bundles 9 are separated by the distance P; and they are then cut into pieces having a desired depth to form a cover 4 in the shape of a bag. That is, in the formed cover 4, a side thereof which extends in the direction along the vertically opposite sides and is located opposite to the side which extends in the direction along the vertically opposite sides and is made in a bonded state by heat sealing is not made in a bonded state.

In the vacuum sealing, the core 3 is inserted into the cover 4, and is provided in a vacuum chamber. A decompression process is performed on the vacuum chamber, which accommodates the cover 4 containing the core 3 inserted therein. In the decompression process, decompression is performed to achieve a vacuum pressure of approximately, for example, 0.1 to 3 Pa. In the cover 4 being subjected to the decompression process, the side of the cover 4 which extends in the direction in which adjacent thickness fiber bundles 9 are separated by the distance P, and is not in a bonded state, is bonded by heat sealing. After the bonding of this side by heat sealing, the pressure in the vacuum chamber is returned to the atmospheric pressure, and the cover 4 which is subjected to vacuum sealing, with the core 3 inserted in the cover 4, is taken out from the vacuum chamber, and is used as the vacuum heat insulator 1. In the decompression process, an adsorbent (a single substance or complex of, for example, calcium oxide, zeolite, or barium-lithium alloy) may be added as occasion arises. Such an absorbent can adsorb water and air, and can thus improve the degree of vacuum.

In the vacuum heat insulator 1 manufactured by the above manufacturing method, glass fibers are present in space having a volume ratio of approximately 10% of the core 3, and vacuum space is ensured in the other space, i.e., space having a volume ratio of approximately 90% of the core 3. In such a manner, the vacuum heat insulator 1 according to embodiment 1 contains the vacuum space having a volume ratio of approximately 90% of the core 3, and can thus achieve a high heat insulation performance.

In the vacuum heat insulator 1 manufactured by the above manufacturing method, not only the long fibers 8 of the second fiber layer 7 included in the core 3, but the short fibers 6 of the first fiber layer 5 are layered while being oriented in a direction substantially perpendicular to the thickness direction of the vacuum heat insulator 1. By virtue of such orientation and layered characteristics of the short fibers 6 and the long fibers 8, the vacuum heat insulator 1 according to embodiment 1 achieves a high heat insulation performance.

Embodiment 2

Figure 8:
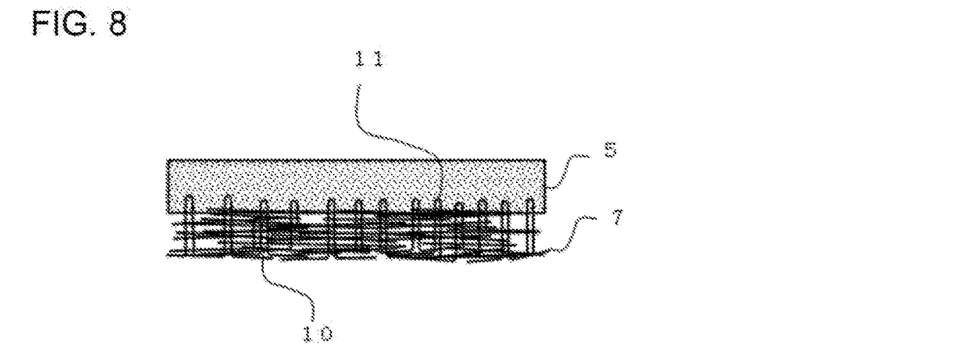
FIG. 8 is a schematic sectional view of a stacked structure of a first fiber layer and a second fiber layer in embodiment 2 of the present invention.

The vacuum heat insulator 1 according to embodiment 2 of the present invention will be described. FIG. 8 is a schematic sectional view of a stacked structure of the first fiber layer 5 and the second fiber layer 7 in embodiment 2 of the present invention. The second fiber layer 7 is provided with fiber protrusions 11 on its surface which is opposite to a surface including the fiber openings 10 formed therein. In the vacuum heat insulator 1 according to embodiment 2, the first fiber layer 5 and the second fiber layer 7 are stacked such that the first fiber layer 5 and the surface of the second fiber layer 7 at which the fiber protrusions 11 are formed contact each other. The other configurations are the same as those in embodiment 1.

As illustrated with respect to embodiment 1, in the case of forming the thickness fiber bundles 9 by driving needles, for example, the fiber protrusions 11 can be formed to have an inverted U shape at a surface opposite to a surface into which the needles are driven to form the thickness fiber bundles 9, by adjusting the distance by which the needles are to be driven, or the like. That is, the height of the thickness fiber bundles 9 (the length from the surface including the fiber openings 10 to the tips of the fiber protrusions 11) is greater than the thickness of the second fiber layer 7. In such a manner, since the first fiber layer 5 is stacked on the surface of the second fiber layer 7 at which the fiber protrusions 11 are formed, the thickness fiber bundles 9 can be inserted into the first fiber layer 5. Therefore, the first fiber layer 5 and the second fiber layer 7 are fixed at part of the contact surface.

The above vacuum heat insulator 1 according to embodiment 2 adopts a configuration that the height of the thickness fiber bundles 9 (the length from the surface including the fiber openings 10 to the tips of the fiber protrusions 11) is greater than the thickness of the second fiber layer 7. However, the configuration of the present invention is not limited to such a configuration. The height of the thickness fiber bundles 9 (the length from the surface including the fiber openings 10 to the tips of the fiber protrusions 11) may be smaller than the thickness of the second fiber layer 7. In this configuration, since the distance by which the needles are driven is small, it is expected to improve the efficiency of the needle punching.

In the case where the height of the thickness fiber bundles 9 is smaller than the thickness of the second fiber layer 7, the fiber layer 2 is provided into an inner bag in advance, subjected to preliminary vacuum sealing, and compressed. In this compression process, the thickness of the second fiber layer 7, which has a porosity of 95% or higher, is reduced to half or less. In the case of considering the likelihood regarding the compression process, preferably, the height of the thickness fiber bundles 9 should be greater than or equal to ½ of the thickness of the second fiber layer 7. In the case of considering the trouble for execution of the compression process, preferably, the height of the thickness fiber bundles 9 should be greater than or equal to or than the thickness of the second fiber layer 7.

In the vacuum heat insulator 1 according to embodiment 2, at least some of the thickness fiber bundles 9 included in the second fiber layer 7 protrude into the first fiber layer 5. Because of the second fiber layer 7 protruding into the first fiber layer 5, the second fiber layer 7 is fixed. Thus, the tensile strength of the fiber layer 2 can be increased. Therefore, as in embodiment 1, it is possible to increase the distance P with respect to the arrangement of the thickness fiber bundles 9, and reduce heat transfer in the thickness direction of the vacuum heat insulator 1 by reducing the number of thickness fiber bundles 9 per unit area. Furthermore, at the contact surface between the first fiber layer 5 and the second fiber layer 7 in the stacked structure, the straight long fibers 8 included in the second fiber layer 7 press the surface of the first fiber layer 5, whereby the short fibers 6 face in a direction perpendicular to the layering direction, and can reduce heat transfer between the first fiber layer and the second fiber layer 7. By virtue of the above features, the heat insulation performance of the vacuum heat insulator 1 can be improved.

Embodiment 3

Figure 9:
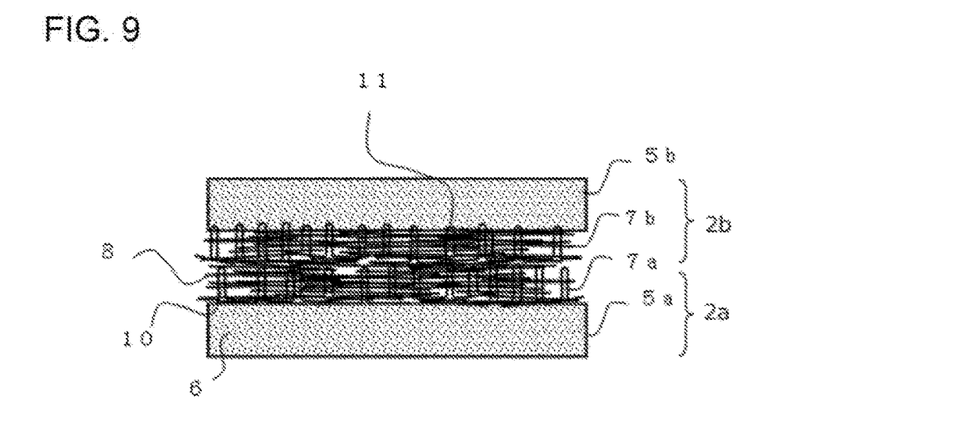
FIG. 9 is a schematic sectional view of a stacked structure of first fiber layers and second fiber layers in embodiment 3 of the present invention.

The vacuum heat insulator 1 according to embodiment 3 of the present invention will be described. FIG. 9 is a schematic sectional view of a stacked structure of the first fiber layers 5 and the second fiber layers 7 in embodiment 3 of the invention. The core 3 includes a first fiber layer 5a, a second fiber layer 7a, a second fiber layer 7b provided as a second fiber layer different from the second fiber layer 7a, and a first fiber layer 5b provided as a first fiber layer different from the first fiber layer 5a, which are stacked in this order. In this stacked structure, the first fiber layers 5a and 5b hold the second fiber layers 7a and 7b therebetween.

In a lower fiber layer 2a made up of the first fiber layer 5a and the second fiber layer 7a, the first fiber layer 5a and the second fiber layer 7a are stacked such that the first fiber layer 5a is in contact with a surface side of the second fiber layer 7a where fiber openings 10 are formed, as in the fiber layer 2 according to embodiment 1. Also, in an upper fiber layer 2b made up of the other first fiber layer and the other second fiber layer, i.e., the first fiber layer 5b and the second fiber layer 7b, the first fiber layer 5b and the second fiber layer 7b are stacked such that the first fiber layer 5b is in contact with a surface side of the second fiber layer 7b where fiber protrusions 11 are formed, as in the fiber layer 2 according to embodiment 2. In the vacuum heat insulator 1 according to embodiment 3, the lower fiber layer 2a and the upper fiber layer 2b having the above configurations are stacked such that the surface side of the second fiber layer 7a where the fiber protrusions 11 are formed is in contact with the surface side of the other second fiber layer 7b where the fiber openings 10 are formed. Therefore, at least some of the thickness fiber bundles 9 included in the second fiber layer 7a protrude into the fiber openings 10 of the second fiber layer 7b. Also, some of the short fibers 6 included in the first fiber layer 5a protrude into the fiber openings 10 formed in the surface of the second fiber layer 7b.

In the vacuum heat insulator 1 according to embodiment 3, as described above, the fiber protrusions 11 of the lower fiber layer 2a protrude into the second fiber layer 7b of the upper fiber layer 2b. Thus, the second fiber layer 7b of the upper fiber layer 2b is fixed, thereby enhancing the tensile strength of the core 3 including the lower fiber layer 2a and the upper fiber layer 2b. Therefore, as in embodiments 1 and 2, it is possible to increase the intervals at which the thickness fiber bundles 9 are arranged in the direction in which adjacent thickness fiber bundles 9 are separated by the distance P, and reduce the number of thickness fiber bundles 9 per unit area, thereby reducing heat transfer in the thickness direction of the vacuum heat insulator 1. In addition, at the contact surface between the first fiber layer 5a and the second fiber layer 7a in the stacked structure, the straight long fibers 8 included in the second fiber layer 7a press the surface of the first fiber layer 5a to cause the plural short fibers 6 to face in the direction perpendicular to the layering direction, thereby reducing heat transfer between the first fiber layer 5a and the second fiber layer 7a. Furthermore, at the contact surface between the first fiber layer 5b and the second fiber layer 7b in the stacked structure, the straight long fibers 8 included in the second fiber layer 7b press the surface of the first fiber layer 5b to cause the plural short fibers 6 face in the direction perpendicular to the layering direction, thereby reducing heat transfer between the first fiber layer 5b and the second fiber layer 7b. Therefore, the heat insulation performance of the vacuum heat insulator 1 can be improved.

Embodiment 4

Figure 10:
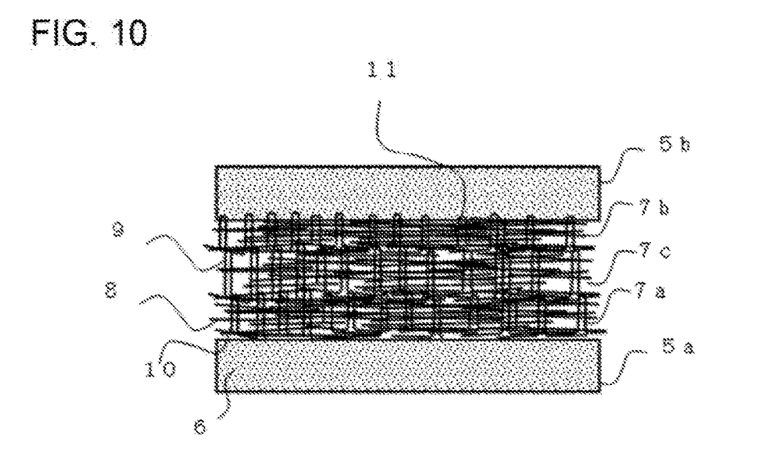
FIG. 10 is a schematic sectional view of a stacked structure of first fiber layers and second fiber layers in embodiment 4 of the present invention.

The vacuum heat insulator 1 according to embodiment 4 of the present invention will be described. FIG. 10 is a schematic sectional view of a stacked structure of the first fiber layers 5 and the second fiber layers 7 in embodiment 4 of the invention. Another second fiber layer, i.e., a second fiber layer 7c, is inserted between the second fiber layer 7a and the second fiber layer 7b in the vacuum heat insulator 1 according to embodiment 3 as illustrated in FIG. 8. The other configurations of the vacuum heat insulator 1 according to embodiment 4 are the same as those of the vacuum heat insulator 1 according to embodiment 3.

At least some of the thickness fiber bundles 9 of the inserted second fiber layer 7c protrude into the second fiber layer 7b. In addition, at least some of the thickness fiber bundles 9 of the second fiber layer 7a protrude into the inserted second fiber layer 7c. It is therefore possible to enhance the tensile strength of the core 3. Also, it is possible to increase the intervals at which the thickness fiber bundles 9 are arranged in the direction in which adjacent thickness fiber bundles 9 are separated by the distance P, and reduce the number of thickness fiber bundles 9 per unit area, thereby reducing heat transfer in the thickness direction of the vacuum heat insulator 1.

Embodiment 5

Figure 11:
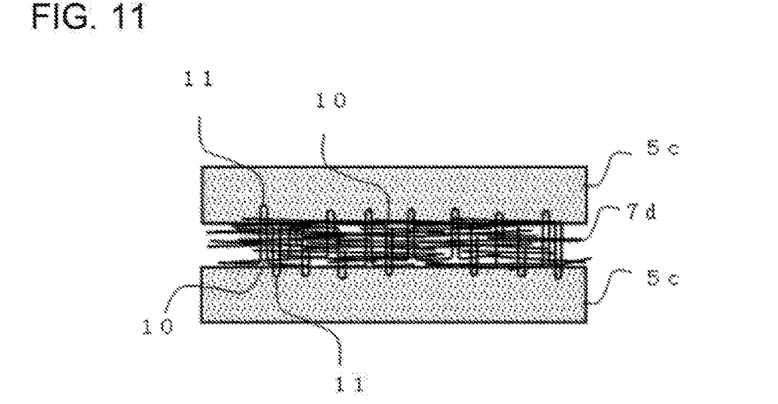
FIG. 11 is a schematic sectional view of a stacked structure of first fiber layers and a second fiber layer in embodiment 5 of the present invention.

The vacuum heat insulator 1 according to embodiment 5 of the present invention will be described. FIG. 11 is a schematic sectional view of a stacked structure of first fiber layers 5c and a second fiber layer 7d according to embodiment 5 of the invention. The fiber layer 2 included in the core 3 of the vacuum heat insulator 1 is made up of two first fiber layers 5c and a single second fiber layer 7d held between the two first fiber layers 5c. The second fiber layer 7d includes plural fiber openings 10 and plural fiber protrusions 11 on its both surface sides. In other words, in the vacuum heat insulator 1 according to embodiment 5, the first fiber layers 5c adjoin the both sides of the second fiber layer 7d, respectively.

In embodiment 5, the thickness fiber bundles 9 are formed from both sides of the second fiber layer 7d in the same manner, as viewed in plan view, and the plural fiber openings 10 and the plural fiber protrusions 11 are provided on the both side of the second fiber layer 7d. Therefore, at least some of the thickness fiber bundles 9 on one surface side of the second fiber layer 7d protrude into one of the first fiber layers 5c, and the short fibers 6 of the other of the first fiber layers 5c protrude into some of the fiber openings 10 on the other surface side of the second fiber layer 7d. In addition, at least some of the thickness fiber bundles 9 on the above other surface side of the second fiber layer 7d protrude into the above other of first fiber layers 5c, and the short fibers 6 of the above one of the first fiber layers 5c protrude into some of the fiber openings 10 on the above one surface side of the second fiber layer 7d. Accordingly, the second fiber layer 7d can be firmly fixed by the provision of the thickness fiber bundles 9 on the both surface sides of the second fiber layer 7d. As a result, the tensile strength of the core 3 can be enhanced. Therefore, as in embodiments 1 to 4, it is possible to increase the intervals at which the thickness fiber bundles 9 are arranged in the direction in which adjacent thickness fiber bundles 9 are separated by the distance P, and reduce the number of thickness fiber bundles 9 per unit area, thereby reducing heat transfer in the thickness direction of the vacuum heat insulator 1. In addition, at the contact surfaces between the two first fiber layers 5c and the second fiber layer 7d held therebetween, the straight long fibers 8 included in the second fiber layer 7d press the surfaces of the two first fiber layers 5c to cause the plural short fibers 6 to face in the direction perpendicular to the layering direction, thereby reducing heat transfer between the two first fiber layers 5c and the second fiber layer 7d. It is therefore possible to further improve the heat insulation performance of the vacuum heat insulator 1.

Embodiment 6

Figure 12:
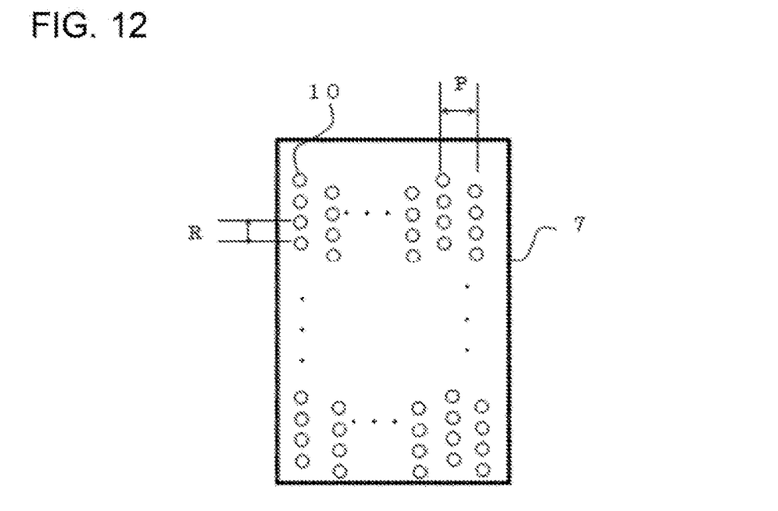
FIG. 12 is a schematic view illustrating arrangement of thickness fiber bundles of a second fiber layer in embodiment 6 of the present invention.

The vacuum heat insulator 1 according to embodiment 6 of the present invention will be described. FIG. 12 is a schematic view illustrating arrangement of the thickness fiber bundles 9 of the second fiber layer 7 in embodiment 6 of the invention. To be more specific, this figure illustrates distribution of the fiber openings 10 included in the second fiber layer 7 as seen in plan view. As illustrated in FIG. 12, the second fiber layer 7 includes plural fiber openings 10 arranged in a staggered manner. The other configurations of the vacuum heat insulator 1 according to embodiment 6 are the same as those of the vacuum heat insulator 1 according to embodiment 1 that includes the second fiber layer 7 as illustrated in FIG. 4.

In the vacuum heat insulator 1 according to embodiment 6, the fiber openings 10 are arranged in a stagger manner, that is, the thickness fiber bundles 9 are arranged in a staggered manner. The intervals at which the thickness fiber bundles 9 are arranged in the direction in which adjacent thickness fiber bundles 9 are separated by the distance P are greater than the intervals at which the thickness fiber bundles 9 are arranged in the direction in which adjacent thickness fiber bundles 9 are separated by the distance R, as in embodiments 1 to 5. It is therefore possible to enhance the fiber strength not only against a tensile stress which acts in the longitudinal or transverse direction of the fiber layer 2, as seen in plan view, but also against a tensile stress acting in an oblique direction. Accordingly, it is possible to provide a vacuum heat insulator having a heat insulation performance which is improved because of reduction of the number of thickness fiber bundles, and also having an improved strength and reliability.

Embodiment 6 is explained above by referring to by way of example the case where the plural fiber openings 10 are arranged in a staggered manner on one surface side of the second fiber layer 7. The present invention, however, is not limited to such an example. The plural fiber openings 10 may be provided on the both surface sides of the second fiber layer 7, and arranged in a stagger manner on each of these surface sides. This is because the short fibers 6 of one of the first fiber layers 5c protrude into some of the fiber openings 10 on one surface side of the second fiber layer 7d, and at the same time, the short fibers 6 of the other of the first fiber layers 5c protrude into some of the fiber openings 10 on the other surface side of the second fiber layer 7d, thereby firmly fixing the second fiber layer 7, and further enhancing the tensile strength of the core 3.

In the case of the provision of the fiber opening 10 on the both surface sides of the second fiber layer 7, half of the fibrous openings as illustrated in FIG. 10 may be interchanged in a regular order. Also, with respect to on one of the surface sides or the other, the ratio between the fiber openings 10 and the fiber protrusions 11 may be intentionally changed. For example, the plural fiber openings 10 may be arranged such that a first column of fiber openings 10 are provided on one surface side of the second fiber layer 7, a second column of fiber openings 10 are provided on the other surface side of the second fiber layer 7, a third column of fiber openings 10 are provided on the above one surface side of the second fiber layer 7, and this pattern is repeated with respect to the following columns of fiber openings 10. Also, the plural fiber openings 10 may be arranged such that a first row of fiber openings 10 are provided on the above one surface side of the second fiber layer 7, a second row of fiber openings 10 are provided on the above other surface side of the second fiber layer 7, a third row of fiber openings 10 are provided on the above one surface side of the second fiber layer 7, and this patter is repeated with respect to the following rows of fiber openings 10. Furthermore, the plural fiber openings 10 may be arranged such that the first and second columns of fiber openings 10 are provided on the above one surface side of the second fiber layer 7, the third and fourth columns of fiber openings 10 are provided on the above other surface side of the second fiber layer 7, fifth and sixth columns of fiber openings 10 are provided on the above one surface side of the second fiber layer 7, and this patter is repeated with respect to the following columns of fiber openings 10. By virtue of the above change of the arrangement of the fiber openings 10, the core 3 can be flexibly made to have a desired tensile strength.

Embodiment 7

Figure 13:
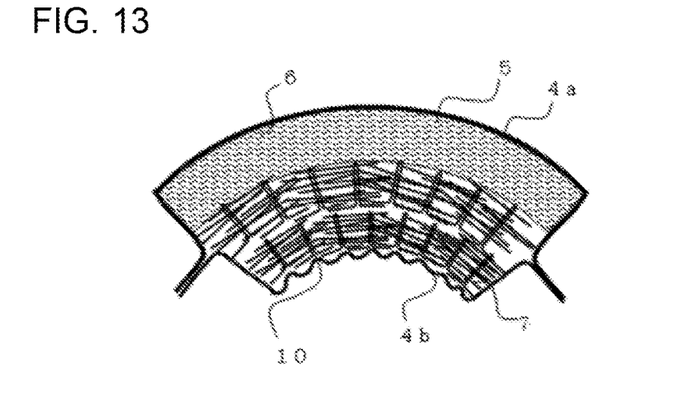
FIG. 13 is a schematic sectional view of a curved vacuum heat insulator according to embodiment 7 of the present invention.
Figure 14:
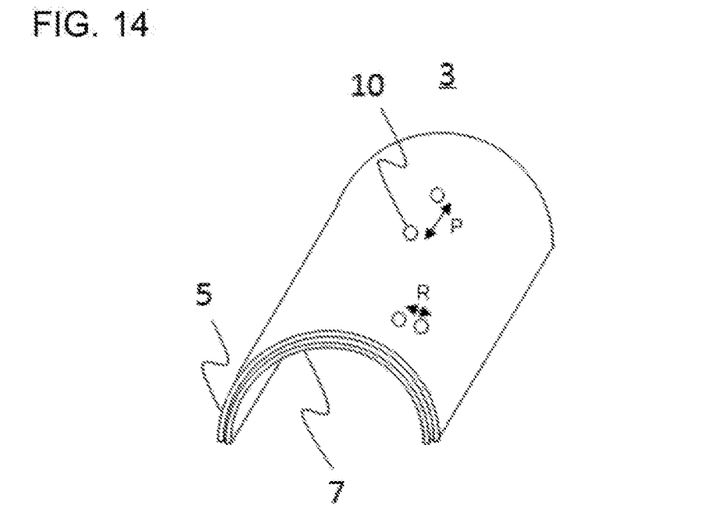
FIG. 14 is a view for explaining intervals between fiber openings provided in a core of the vacuum heat insulator according to embodiment 7 of the present invention.

The vacuum heat insulator 1 according to embodiment 7 of the present invention will be described. FIG. 13 is a schematic sectional view of the vacuum heat insulator 1 which is formed to be curved, according to embodiment 7 of the invention. FIG. 14 is a diagram for explaining intervals between the fiber openings 10 provided in the core 3 of the vacuum heat insulator 1 according to embodiment 7. To be more specific, FIG. 13 is a sectional view of a stacked structure of the vacuum heat insulator 1 which is formed to be curved, and which includes the core 3 made up of the first fiber layer 5 and the second fiber layer 7. To be more specific, the core 3 is formed in the shape of an arc in a direction along a minor axis, and continuously extends in a direction along a major axis, with the shape of the arc in the direction along the minor axis. In an example illustrated in FIG. 13, the upper first fiber layer 5 is stacked on the lower second fiber layer 7. The vacuum heat insulator 1 is formed in the shape of the arch such that the lower second fiber layer 7 is located on an inner peripheral side, and the upper first fiber layer 5 is located on an outer peripheral side. That is, the first fiber layer 5 is located on the outer peripheral side of the arc, and the second fiber layer 7 is located on the inner peripheral side of the arc. The other configurations of the vacuum heat insulator 1 according to embodiment 7 are the same as those of the vacuum heat insulator 1 according to embodiment 2.

In the case where the vacuum heat insulator is formed in the shape of an arc, the length of the outer side (outer peripheral side) of the vacuum heat insulator 1 is different from that of the inner side (inner peripheral side) of the vacuum heat insulator 1 in a circumferential direction thereof. In order to absorb this difference, a tensile stress acts on the outer peripheral side, and a compressive stress acts on the inner peripheral side. It should be noted that the first fiber layer containing the short fibers 6 having crimp properties is located on the outer peripheral side. The above tensile stress is applied to stretch the short fibers 6, thereby reducing the crimp properties of the short fibers. In contrast, on the inner peripheral side, the second fiber layer 7 is provided, which includes the thickness fiber bundles 9 extending in the radial direction of the above arc. Thus, the above compressive stress is made to act in the circumferential direction, with the thickness fiber bundles 9 serving as the starting point, whereby the core 3 can be easily bent.

If the core 3 is made to have deep creases by the compression stress, many of the short fibers 6 may be made to face in the thickness direction of the vacuum heat insulator 1. If so, in the thickness direction of the vacuum heat insulator 1, heat is easily transferred via the many short fibers 6 facing in the thickness direction of the vacuum heat insulator 1, as a result of which the heat insulation performance of the vacuum heat insulator 1 can be worsened. However, in the vacuum heat insulator 1 according to embodiment 7, the first fiber layer is located on the outer peripheral side, while the second fiber layer is located on the inner peripheral side, thereby preventing formation of deep creases in the core 3, and also preventing worsening of the heat insulation performance, which would occur due to deep creases. In addition, since the fiber openings 10 are located on the inner peripheral side, they can further absorb the compressive stress. Therefore, according to embodiment 7, although the vacuum heat insulator 1 is formed to be curved, it has a high heat insulation performance and reliability.

In the vacuum heat insulator 1 according to embodiment 7 of the present invention, the plural fiber openings 10 are arranged such that the distance P is greater than the distance R. Furthermore, the fiber openings 10 are arranged such that the direction in which fibers openings 10 are arranged at intervals of the distance R is coincident with the circumferential direction of the arc. That is, the number of thickness fiber bundles 9 arranged in the circumferential direction is larger than that of thickness fiber bundles arranged in a direction along the major axis of the arc. Therefore, in the vacuum heat insulator 1 according to embodiment 7, in the case where the radius of curvature is set small, many of the thickness fiber bundles 9 can serve as the starting points of curving. Therefore, the vacuum heat insulator can be formed in the shape of an arc closer to a curve, and can thus be more easily curved, as compared with a vacuum heat insulator in which a larger number of thickness fiber bundles 9 are arranged in the major axis of the arc. Furthermore, the accuracy of processing is improved, thus achieving a higher heat insulation performance.

Embodiment 8

The vacuum heat insulator 1 according to embodiment 8 of the present invention will be described. More specifically, a method of manufacturing the vacuum heat insulator 1 according to embodiment 8 will be described. The vacuum heat insulator 1 according to embodiment 8 includes the second fiber layer 7 as illustrated in FIG. 5. The thickness fiber bundles 9 are arranged at intervals of R mm in the column direction and at intervals of P mm in the row direction, as illustrated in FIG. 4. The other configurations of embodiment 8 are the same as those of embodiment 1.

Figure 15:
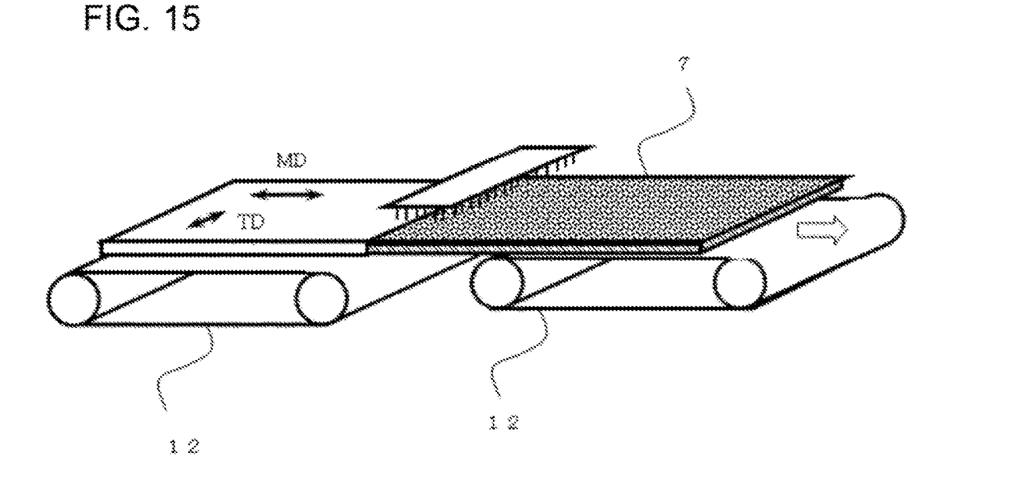
FIG. 15 is a view for explaining a method of manufacturing a second fiber layer of a vacuum heat insulator according to embodiment 8.

FIG. 15 is a diagram for explaining a method of manufacturing the second fiber layer 7 of the vacuum heat insulator 1 according to embodiment 8. The second fiber layer 7 is subjected to processes such as a binding process using, for example, continuous equipment including conveyors 12. In FIG. 15, a double-headed arrow denoted by MD indicates the distance R (mm) between any adjacent two of the thickness fiber bundles 9 arranged in the traveling direction of the conveyors, and a double-headed arrow denoted by TD indicates the distance P (mm) between any adjacent two of the thickness fiber bundles 9 arranged in the direction perpendicular to the traveling direction of the conveyors.

In the case of providing the thickness fiber bundles 9, in order that the second fiber layer 7 be continuously transferred using continuous equipment such as conveyors, the second fiber layer 7 itself is required to have a sufficient tensile strength. In the vacuum heat insulator 1 according to embodiment 8, it is set that R<P. It is therefore possible to reduce the total number of thickness fiber bundles 9 as much as possible, while ensuring a minimum tensile strength against the continuous equipment such as conveyors. Thus, the number of thickness fiber bundles 9 per unit area, which are included in the second fiber layer, can be reduced, and the performance of the vacuum heat insulator can be made higher.

<Analysis and Performance Evaluation on Vacuum Heat Insulator>

If many thickness fiber bundles 9 are provided, there is a possibility that heat transfer will be promoted by these thickness fiber bundles 9, and the heat insulation performance will thus be worsened. In view of this point, the performance of the vacuum heat insulator 1 according to embodiment 8 was estimated by calculation based on a model analysis in consideration of the relationship between the thickness fiber bundles 9 and the heat insulation performance. On the assumption that the distance R in the direction of MD is 3 mm and the distance P is applied as a parameter, the calculation was performed on the basis of the relationship between the distance P and the thickness t (mm) of the second fiber layer. As a result, in the case where P/t≥0.4, deterioration of the thermal conductivity was reduced by half, and in the case where P/t≥0.7, deterioration of the thermal conductivity which is caused by the thickness fiber bundles 9 was approximately 5%, that is, it was negligibly small. Furthermore, a prototype was made, and with respect to the prototype, a test was conducted with respect to the extent of fiber bundles. As a result, it was confirmed that in the case where R/t exceeds approximately 3, fibers were separated and could not be bound. In view of the result of the model analysis, it is preferable that the second fiber layer be formed to satisfy "0.4≤R/t≤3", and also it be formed to satisfy "0.7≤R/t≤3".

As described above, and demonstrated by the model analysis and test, the vacuum heat insulator 1 according to each of the embodiments of the present invention can reduce the number of thickness fiber bundles 9 per unit area, which are included in the second fiber layer, while ensuring the reliability of the vacuum heat insulator 1. The vacuum heat insulator 1 can thus achieve a higher performance.

The present invention is not limited to the contents of the above detailed description or representative embodiments as described. Modification or advantages which can be easily derived by a person with ordinary skill in the art are also covered by the present invention. Therefore, various modifications can be made without departing from the overall spirit or scope of the invention defined by the accompanying claims and their equivalents.

REFERENCE SIGNS LIST 1 vacuum heat insulator 2 fiber layer 3 core 4 cover 4a cover sheet 4b cover sheet 5 first fiber layer 5a first fiber layer 5b first fiber layer 5c first fiber layer 6 short fiber 7 second fiber layer 7a second fiber layer 7b second fiber layer 7c second fiber layer 7d second fiber layer 8 long fiber 9 thickness fiber bundle 10 fiber opening 11 fiber protrusion

The invention claimed is:

1. A vacuum heat insulator comprising:
a core having a thickness to reduce heat transfer in a thickness direction of the core from one surface side of the core to an other surface side of the core,
wherein the core comprises:
a first fiber layer including plural short fibers which are formed of glass; and
a second fiber layer including a stacked structure of plural long fibers distributed over an entire plane of the second fiber layer, and plural thickness fiber bundles,
wherein the plural short fibers of the first fiber layer have crimp properties and are intertwined with each other and layered in the thickness direction of the first fiber layer to form a sheet,
wherein the stacked structure of the second fiber layer is constructed such that the plural long fibers having straightness which are formed of glass extending in perpendicular direction of the second fiber layer and not intertwined with each other are layered in thickness direction,
wherein each of the plural thickness fiber bundles extends in the thickness direction of the second fiber layer and binds the plural long fibers,
wherein the plural thickness fibers are provided at intervals so as to form an integrated sheet by binding the long fibers of the stacked structure,
wherein the plural long fibers included in the second fiber layer are longer than the plural short fibers included in the first fiber layer, and
wherein the first fiber layer and the second fiber layer are stacked in contact with each other.

2. The vacuum heat insulator of claim 1, wherein the plural thickness fiber bundles include respective fiber openings each of which is formed on one surface side of the second fiber layer or an other surface side thereof.

3. The vacuum heat insulator of claim 2, wherein
the first fiber layer and the second fiber layer are in contact with each other, and
some of the plural short fibers are inserted into the fiber openings.

4. The vacuum heat insulator of claim 1, wherein the plural thickness fiber bundles include respective fiber protrusions each of which protrudes on the one surface side of the second fiber layer or the other surface side thereof.

5. The vacuum heat insulator of claim 4, wherein the fiber protrusions protrude into the first fiber layer.

6. The vacuum heat insulator of claim 1, wherein the plural thickness fiber bundles have lengths in the thickness direction which are smaller than a length of the core in the thickness direction.

7. The vacuum heat insulator of claim 1, wherein
the plural thickness fiber bundles are arranged in a longitudinal direction and a transverse direction of the core, which are different from the thickness direction, and
the plural thickness fiber bundles are arranged at intervals in the longitudinal direction, which are smaller than intervals at which the plural thickness fiber bundles are arranged in the transverse direction.

8. The vacuum heat insulator of claim 7, wherein the plural thickness fiber bundles arranged in the longitudinal direction and the transverse direction are arranged in a staggered manner in the second fiber layer.

9. The vacuum heat insulator of claim 8, wherein
the core is formed in a shape of an arc in a direction along a short axis of the core, and continuously extends in a direction along a long axis of the core, and
the first fiber layer is located on an outer peripheral side of the core formed in the shape of the arc, and the second fiber layer is located on an inner peripheral side of the core formed in the shape of the arc.

10. The vacuum heat insulator of claim 1, wherein the plural long fibers and the plural thickness fiber bundles are formed of the same material.

11. The vacuum heat insulator of claim 1, wherein the core includes plural fiber layers which are stacked together, and in each of which the first fiber layer and the second fiber layer are stacked together.

12. The vacuum heat insulator of claim 1, wherein the plural thickness fiber bundles are arranged in a longitudinal direction and a transverse direction of the core, which are different from the thickness direction.

* * * * *